Aug. 31, 1948.   F. W. SECKEL   2,448,054
CONVERTIBLE TOP FOR AUTOMOBILES OR THE LIKE
Filed Dec. 23, 1944   3 Sheets-Sheet 2
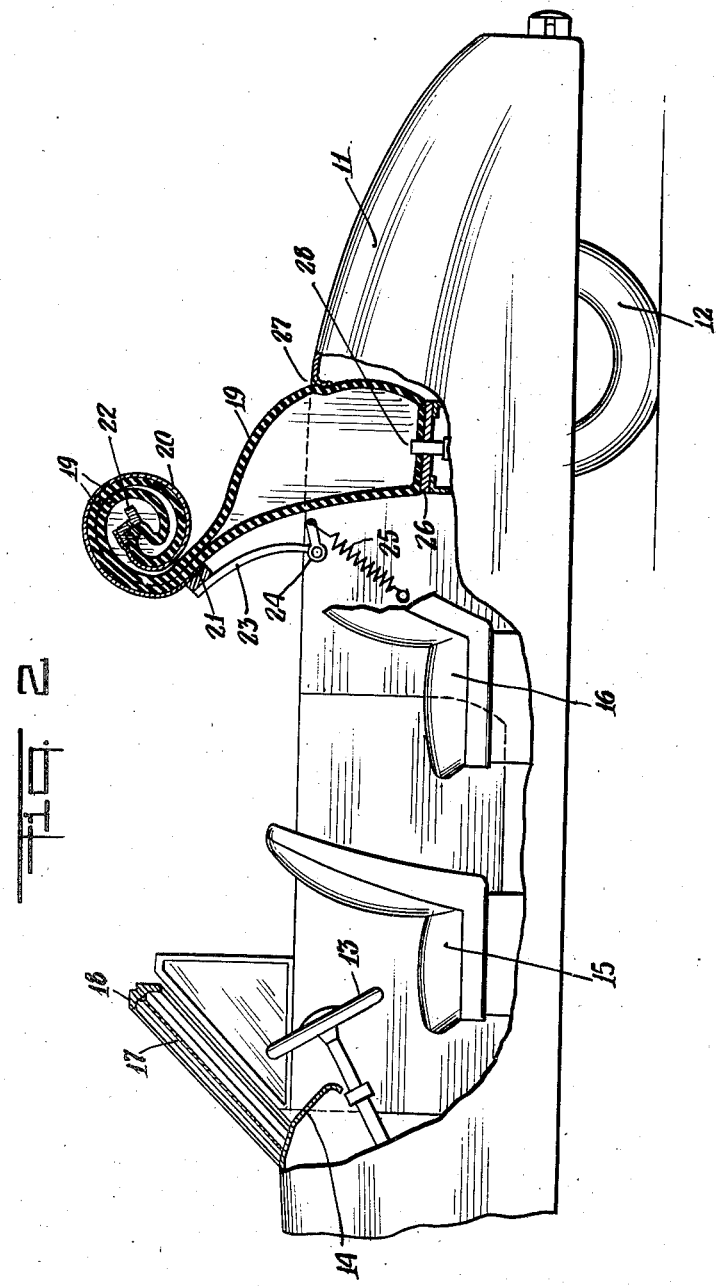
INVENTOR.
Friedrich Wilhelm Seckel
BY Mock & Blum
ATTORNEYS Aug. 31, 1948.    F. W. SECKEL    2,448,054
CONVERTIBLE TOP FOR AUTOMOBILES OR THE LIKE
Filed Dec. 23, 1944    3 Sheets-Sheet 3
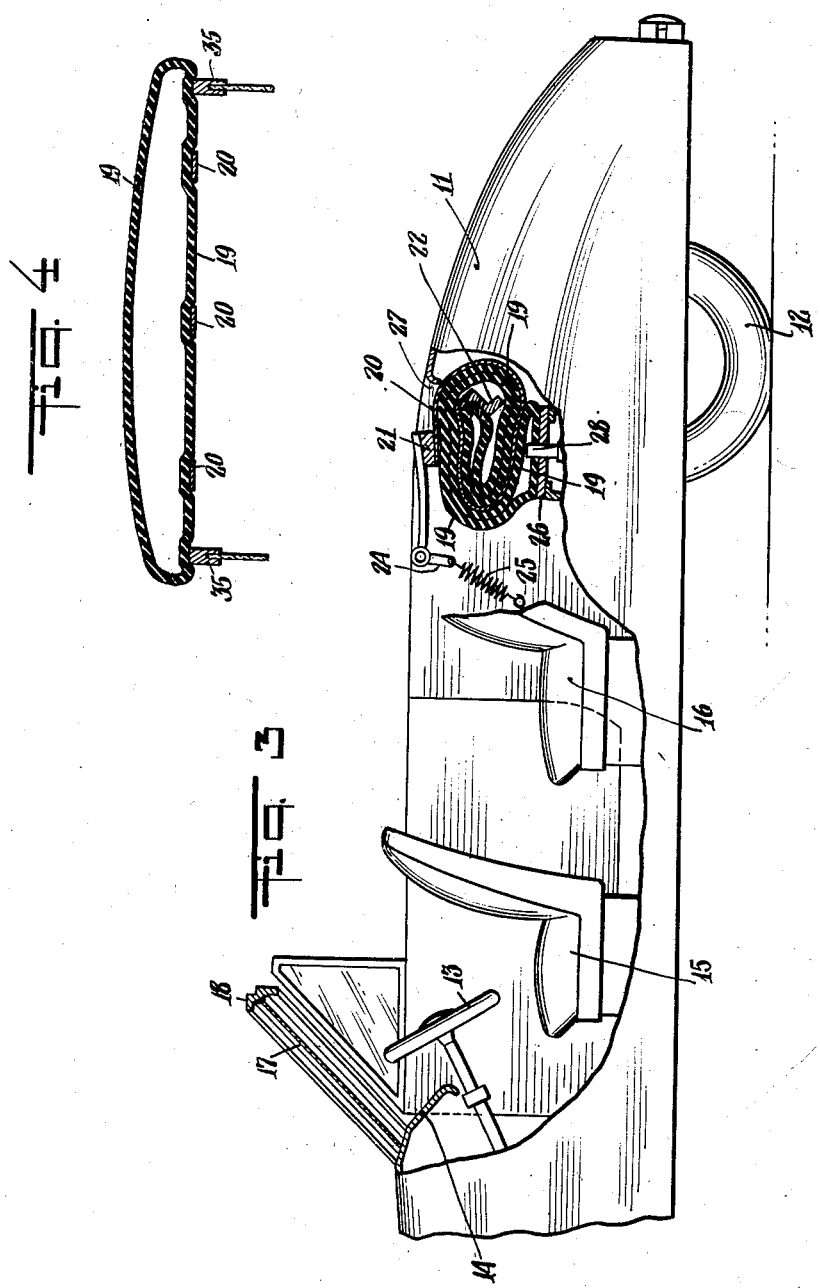
INVENTOR.
Friedrich Wilhelm Seckel
BY Mock & Blum
ATTORNEYS

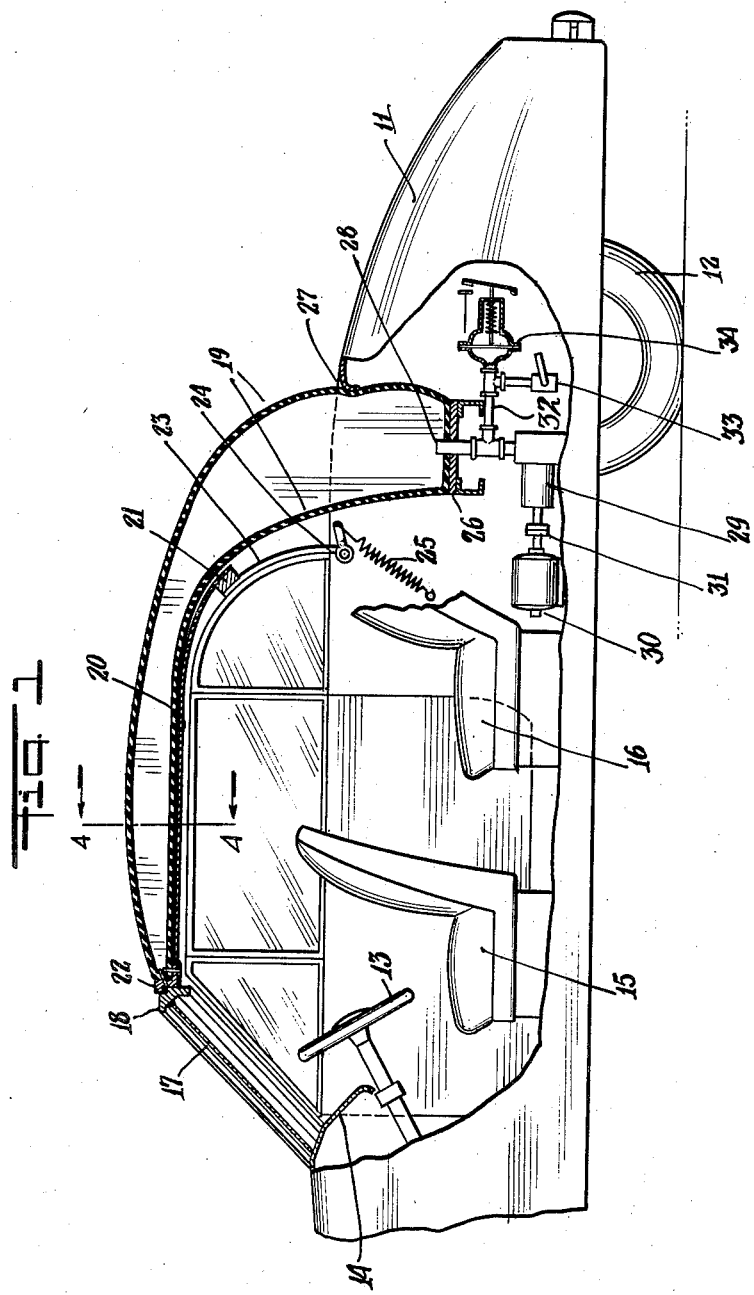

UNITED STATES PATENT OFFICE 2,448,054

CONVERTIBLE TOP FOR AUTOMOBILES OR THE LIKE

Friedrich Wilhelm Seckel, New York, N. Y.

Application December 23, 1944, Serial No. 569,462

2 Claims. (Cl. 296—107)

This invention relates to convertible tops for passenger automobiles, especially to demountable tops which are raised and lowered by mechanical means such as motors, hydraulic cylinders, and the like. The particular object of this invention is to provide a demountable top which is hollow, mainly air-filled, and which can be raised and held in shape by means of pneumatic pressure from the inside thereof. A further object thereof is to provide a demountable top which by reason of its construction provides an insulating layer of air, and, therefore, effectively protects the inside of the car against temperature changes, and which shields the inside of the car from the heat of the sun in summer and from cold air in winter. A further object of the invention is the provision of a demountable top which by reason of its construction will be sufficiently elastic to make a close fit with the adjoining less elastic members of the car, such as window frames, door frames, and the like, thus decreasing the difficulties with present designs which may warp in use and with increasing age result in imperfect adjustments with adjoining parts of the vehicle.

Further objects of the invention will be apparent from the specification and drawings in which Fig. 1 shows a longitudinal cross section through the center and rear portions of a passenger car equipped with my demountable top in raised or operative position wherein parts of the car not pertaining to the operation have been shown in outline only or have been omitted. Fig. 2 shows a longitudinal cross section through the portion of the car shown in Fig. 1, showing the car with lowered windows and the top in half-lowered position. Fig. 3 shows a longitudinal cross section with the windows lowered but with the top in completely lowered or demounted position. Fig. 4 shows a cross section along the lines of 4—4 in Fig. 1. 11 indicates the body of the car resting upon the rear wheels 12, 13 the steering wheel, 14 the dashboard, 15 the driver's seat, and 16 the rear seat, part of which is cut away. The windshield is indicated as 17 located in the windshield frame 18.

The demountable top itself 19 consists of an air-tight bag of rubber, impregnated fabric or other similar elastic material which is air-proof and which when blown up under pressure will take the form, when in operative position, shown in Fig. 1. 20 indicates a plurality of flat steel springs running in longitudinal direction along the bottom of bag 9 near the end of the bag and, as shown in Fig. 2, such springs have a tendency to coil up when the pressure against same is removed similar to watch or phonograph motor springs. In the situation shown in Fig. 1 these springs are held in a flat position by the air-pressure in the inflated roof top. The rear end of these springs 20 is fastened to a cross beam 21 while the front ends are fastened to the end beam 22 which when the roof is in raised or operative position fits against the front windshield frame 18. To securely fasten the endbeam 22 to the frame of the front windshield 18 when the top is in raised position, screws, toggles clamps or other means not shown in the drawing may be provided.

The cross beam 21 is fastened to two swinging arms 23. These swinging arms appear on each side of the car just inside the body and said arms are free to revolve around the fulcrums 24. Wire springs 25 have been provided attached to the fulcrums 24, the opposite ends of these springs being attached to lugs on the members 23 and these springs tend to revolve the swinging arms 23 backward towards the rear of the car. It will be noted that the bag 19 when inflated counteracts the backward pull of springs 25 on the arms 23.

26 indicates a member in the form of a board fastened across the car and supported by two structural channels, this board serving as a rest and mounting for the bag 19. The rear of the body of the car is cut out so as to permit the body of the top to rise and the rear edge 27 is rounded for this purpose. The bag presses against this edge when inflated and thus creates a tight seal preventing rain water from entering the car.

To mount the roof top in operative position, the following means are employed: Inserted into the bag is a rear tube 28 connecting with the discharge end of an air compressor 29 which air compressor is driven by an electric motor 30 obtaining its current from the storage battery of the car, the motor and the compressor being connected by means of the coupling 31. A tube 32 is connected with a tube 28, and this tube in turn has two connections or branches on the end of one of which is located a blow-off valve 33, while connected with the other branch is arranged a diaphragm 34. This diaphragm 34 is normally held in position by the pressure in the bag 19 connecting with the tube 33 against the pressure of the spring shown. Where due to a slight lack or for some other reason, the pressure in the system, while the roof is in operative position, should fall under a certain predetermined limit, the spring overcomes the force of the diaphragm and causes an electric contact, which in turn automatically causes the motor and compressor to operate until the desired pressure is re-established.

In order to lower the roof to demountable position, the connection between the member 18 and the member 22 is first loosened, after which the motor is disconnected and the blow-off valve 33 is opened by means of the handle shown. The flat springs 20 are stronger than the coil springs 25 and, therefore, the springs 20 first begin to coil carrying the deflated bag between them. When they have coiled up completely as has been diagrammatically shown in Fig. 2, the pressure has been sufficiently lowered to now permit the springs 25 to act and the cover 19 is now gradually swung by the arms 23 back into the inside of the car in inoperative position as shown in Fig. 3.

To raise the top, the motor is first switched on which causes the air compressor to work and starts inflation of the bag 19. As the inflation proceeds, the arms 23 are swung into upright position by the pressure of the bag and the springs 20 are also moved for the same reason. When the bag is fully distended and the arm 22 contacts the member 18, they are clamped or connected together by means not shown. The motor is automatically stopped through the switch connected to diaphragm 34 when the proper pressure has been reached.

It should also be noted that the starting and stopping of the motor as well as the operation of the blow-off valve 33 are controlled from the dashboard by means not shown herein, but which may be readily devised by well known means.

It should also be noted that the air compressor instead of being driven by an electric motor can also be operated by other means, such as by direct connection to the engine shaft or otherwise. It is obvious also that instead of using motor compression the necessary air can be supplied in fixed form such as compressed air in bottles and the like. Instead of the springs 20, other linkages or springs or tension members such as cables and bands may be substituted; this would fold the bag 19 in a predetermined way and effect its retraction backward into the body when the pressure is lowered.

Fig. 4 is a cross-sectional view showing the bag 19 and the flat springs 20, three of which have been provided in this particular embodiment. This view also shows how the bag fits snugly against and around the window frames 35 and thus seals the inside of the car, which is important in air conditioned vehicles.

In case the force of the springs employed should be insufficient, it is possible to retract the roof from the operative position to the inoperative position by means of an electric motor or by hydraulic or pneumatic cylinders.

I have shown one embodiment of my improved retractable top, but it is clear that changes may be made to adapt same to other vehicles such as trucks, motor boats, railroad cars, and the like, without departing from the spirit of my invention.

What I claim is:

1. A convertible top for automobiles or the like, comprising the combination of an inflatable roof which is formed by an airtight bag of elastic material and is adapted to occupy an inoperative position in the rear of the automobile or the like, in deflated, coiled up condition, and to project over the length of the automobile or the like in inflated, extended condition, said bag having springs running in longitudinal direction attached to it, said springs having the tendency to coil up and carry the deflated bag between them, one end of said bag being mounted in the rear of the automobile or the like, with means for inflating said bag and causing it to project over the length of the car when inflated, the rear ends of said springs being fastened to a first cross-beam, while the front ends are fastened to a second cross-beam which, in the inflated, operative position of the bag, is adapted to fit against the front windshield frame of the car.

2. A convertible top for automobiles or the like, comprising the combination of an inflatable roof which is formed by an airtight bag of elastic material and is adapted to occupy an inoperative position in the rear of the automobile or the like, in deflated, coiled up condition, and to project over the length of the automobile or the like in inflated, extended condition, said bag having springs running in longitudinal direction attached to it, said springs having the tendency to coil up and carry the deflated bag between them, one end of said bag being mounted in the rear of the automobile or the like, with means for inflating said bag and causing it to project over the length of the car when inflated, the rear ends of said springs being fastened to a first cross-beam, while the front ends are fastened to a second cross-beam which, in the inflated, operative position of the bag, is adapted to fit against the front windshield frame of the car, said first cross-beam being fastened to two swinging arms which are under the action of one end of springs, the other ends of the springs being fastened in the rear of the car, said springs tending to revolve said swinging arms towards the rear of the car upon deflation of the bag to assist in the deflation of the bag.

FRIEDRICH WILHELM SECKEL.

REFERENCES CITED

The following references are of record in the file of this patent:

UNITED STATES PATENTS

| Number | Name | Date |
|---|---|---|
| 532,642 | Crowell | Jan. 15, 1895 |
| 1,150,811 | Cooke | Aug. 17, 1915 |
| 1,169,927 | Collier | Feb. 1, 1916 |
| 1,748,736 | Selje | Feb. 25, 1930 |